Patented Oct. 21, 1941

2,259,638

UNITED STATES PATENT OFFICE 2,259,638

PROCESS OF INHIBITING THE HYDRATION OF ANHYDROUS CALCIUM SULPHATE

Winfield Walter Heckert, Ardentown, Del., assignor to E. I. du Pont de Nemours & Company, Wilmington, Del., a corporation of Delaware No Drawing. Application August 19, 1938, Serial No. 225,716

9 Claims. (Cl. 106—306)

The present invention relates to a treatment of the insoluble anhydrite modification of calcium sulphate with a water soluble protein which effects a stabilization of the anhydrous calcium sulphate against hydration.

This application is a continuation-in-part of my co-pending application Serial No. 19,168, filed May 1, 1935.

The insoluble anhydrite modification of calcium sulphate is characterized by a specific X-ray diffraction pattern. The natural occurring anhydrous calcium sulphate is of the insoluble type. It can also be obtained by the calcination of plaster of Paris or gypsum, etc., at temperatures above for instance 500° C. Insoluble anhydrite can also be produced by the dehydration of gypsum in a strong sulphuric acid, or by gradually adding slaked lime to about 60° Baumé sulphuric acid and continuing the reaction until approximately 85% of the acid becomes neutralized.

The present invention relates to the stabilization of the insoluble anhydrite modification of calcium sulphate, and more especially to the precipitated, finely-divided variety useful as a pigment or pigment extender, i. e., anhydrite which is not only of satisfactory pigmentary color, but of requisite frequency particle size average, that is, at least 75% of its particles range preferably within about .5 to 2 microns and none exceed about 5 microns. The invention consists in submitting the finely-divided anhydrite to an aqueous solution of a protein.

Gelatin, glue, egg albumin and other albuminoids were found by me to exert a stabilizing influence upon insoluble anhydrite in contact with an aqueous medium, in that there is a decided slowing down of the hydration of the calcium sulphate.

I am aware that glue and gelatin have been used to prevent the formation of needle-like crystals in precipitating gypsum from an aqueous medium, it had namely been found (see U. S. 879,603 of Feb. 18, 1908, M. Wallerstein) that when one adds gelatin to an aqueous solution of calcium chloride and reacts upon this with sodium sulphate, the precipitated gypsum will be in the shape of relatively large flakes or tablet-like crystals instead of the needles formed in the absence of the gelatin.

My invention is directed to an entirely different phenomenon. The crystal form of the anhydrite in contact with the gelatin or glue solution is not altered, on the contrary I prevent a change in crystal form. These differences in effect are easily understandable when one considers that anhydrite and gypsum are different chemical substances.

The present application is particularly useful when the gypsum is dehydrated in strong sulphuric acid. It is in this case necessary to separate the product formed from the reaction medium which operation comprises washing the product free from acid, filter pressing and drying it. During the latter stages of the washing step, when the acid concentration is very low and during the pressing operation, both of which are apt to be time consuming on a plant scale, there is an opportunity for hydration of the original anhydrite and formation of gypsum crystals is frequently observed.

This formation of gypsum is readily prevented if the anhydrite slurry and the washwater contain a small amount of gelatin, glue or other water-soluble colloidal protein. Amounts found very convenient are, for instance, 0.1% gelatin, based upon the weight of the anhydrite, or 0.025%, based upon the solution, in general the glue is effective with amounts above 0.01%, a practical upper limit being 1%. The pH of the glue solution in which the calcium sulphate is suspended has also a certain effect upon the inhibiting effect of the protein. In general, it is preferred to maintain the reaction of the system at a pH of not less than 4 up to 10 or even more.

The protein material may be adsorbed upon the particles of anhydrite and form a film thereon. In any case, some protein remains associated with the anhydrite after drying.

In cases where the anhydrite is produced by dry methods, it can be protected against subsequent hydration upon being brought into contact with water by mixing with the dry anhydrite a small percentage of water-soluble protein, such as glue, albumin, etc.

The specific effect of glue, gelatin, and other protein colloids in inhibiting the hydration of anhydrite was shown in the following experiments:

A 20% aqueous slurry of freshly precipitated anhydrite was adjusted to a pH of 8 with caustic soda and divided into 3 portions. The anhydrite contained already 4.6% of the $CaSO_4$ as gypsum. One part was used as control. To the other two parts 0.05% and 0.1% animal glue (based on the $CaSO_4$) was added respectively. After 5 days' standing the following results were obtained:

| | |
|---|---|
| No glue | percent gypsum__ 10.7 |
| 0.05% glue | do____ 4.8 |
| 0.1% glue | do____ 4.7 |

The untreated sample had hydrated to a substantial extent whereas practically no hydration had taken place in the glue treated samples.

In another series handled in a similar manner the effect of the pH of the slurry was observed as follows:

Table 1

|  |  | Gypsum at start | Gypsum after 7 days |
|---|---|---|---|
|  |  | Percent | Percent |
| pH5 | No glue | 3.65 | 10.2 |
| pH8 | do | 3.65 | 8.7 |
| pH5 | 0.1% glue | 3.65 | 4.6 |
| pH8 | 0.1% glue | 3.65 | 4.3 |

In a plant operation 5600 lbs. of anhydrite in 20% water slurry was accumulated in a large tank. The slurry was adjusted to pH 8 with sodium hydroxide and a sample removed.

5.6 lbs. of animal glue dissolved in 15 gallons of hot water was then run into the tank and allowed to stir in. Hydration data were obtained as follows:

Table 2

|  | Gypsum at start | Gypsum after 7 days |
|---|---|---|
|  | Percent | Percent |
| Control sample | 3.3 | 6.2 |
| Anhydrite in tank | 3.3 | 3.4 |

Here, again, the hydration in the presence of glue was very slight as compared with that in the untreated control sample.

It will be further noted that in the above cases the addition of glue prevented any further hydration of the anhydrite.

As illustrative of the effect which glue addition has upon freshly precipitated anhydrite which has been prepared under conditions which avoid the presence of appreciable quantities of the hydrated forms of calcium sulphate in the initial slurry, and to demonstrate the negligible extent of hydration occurring upon treatment in accordance with my invention, the following example is given:

A 20% aqueous slurry of freshly precipitated anhydrite was adjusted to a pH of 8 with a small amount of milk of lime and divided into 2 parts. One of the portions was used as a control while 0.10% of animal glue (0.10 grams per 100 grams $CaSO_4$) was added to the other. The two samples were observed for hydration over a period of 10 days with the following results expressed as percentage conversion to gypsum:

Table 3

|  | Time (days) | | | |
|---|---|---|---|---|
|  | 1 | 4 | 6 | 10 |
|  | Percent | Percent | Percent | Percent |
| Control | 2.4 | 14.5 | 25.7 | 63.3 |
| Glue treated | 0.05 | 0.1 | .4 | 0.6 |

As will be evident, my invention affords the production of pigment-useful insoluble anhydrite desirably and effectively stabilized against hydration. The treated calcium sulphate particles will be found to be relatively free from any tendency to grow or increase in size when in contact with aqueous media, and especially during pigment washing or other processing, when prolonged contact therewith is unavoidable. The formation of gypsum with consequent increase in particle size of the calcium sulphate deleteriously affects the adaptability of the anhydrite for pigment used, since gypsum presence results (1) in poor texture and (2) in loss in tinting strength and hiding power of the pigment, the retention of both of which is obviously desirable, and in fact necessary, to render the pigment commercially adaptable.

I am also aware that use of proteids for delaying or retarding the hydration of soluble anhydrite and plaster of Paris or hemihydrate calcium sulphate, has already been proposed. However, any such degree of stabilization as is required for commercially-acceptable, pigment grade, insoluble anhydrite does not result from such treatment. Thus, even when resort is had to concentrations of proteids ranging to as high as ten times the amount which I normally employ for effecting relatively complete stabilization of pigment grade insoluble anhydrite, hydration of soluble anhydrite or hemihydrate calcium sulphate goes substantially to completion, to yield stubby, hexagonal crystals of gypsum. This difference in behavior is apparently related to the difference in crystal structure between these forms of calcium sulphate. X-ray examination indicates that the structure of soluble anhydrite is quite similar to that of calcium sulphate hemihydrate, whereas that of insoluble anhydrite is markedly different. The stability to hydration of proteid-treated, insoluble anhydrite is still more surprising, in view of its very fine particle size, much finer than, for example, flooring plaster which would be entirely unsuitable for pigment use because of its large particle size. Small particle size should favor hydration and thus make the problem of stabilizing against hydration much more difficult in the case of pigment grade, insoluble anhydrite than in case of plasters made from soluble anhydrite or calcium sulphate hemihydrate, whereas I have found the reverse to be true.

I claim as my invention:

1. In a process of producing pigment-useful, insoluble anhydrite at least 75 per cent of the particles of which have an average particle size ranging from substantially .5–2 microns, which involves the production through precipitation of insoluble anhydrite in contact with sulphuric acid and the washing of said insoluble anhydrite with an aqueous medium, the step of inhibiting the hydration of said insoluble anhydrite which comprises contacting it with about .01% to 1%, based on the weight of the anhydrite, of a water-soluble protein prior to separation of said anhydrite from said aqueous medium.

2. In a process of producing pigment-useful, insoluble anhydrite at least 75 per cent of the particles of which have an average particle size ranging from substantially .5–2 microns, which involves the production through precipitation of insoluble anhydrite in contact with sulphuric acid and the washing of said insoluble anhydrite with an aqueous medium, the step of inhibiting the hydration of said insoluble anhydrite which comprises contacting it with about .01% to 1% of a water-soluble protein prior to separation from said aqueous medium and after the washing is completed.

3. In a process of completely stabilizing pigment-useful, precipitated insoluble anhydrite at least 75 per cent of the particles of which have an average particle size ranging from substantially .5–2 microns, against hydration, the step of contacting said anhydrite with an aqueous solution containing glue in an amount from 0.01 to 1%, based on the anhydrite, prior to its separation from an aqueous sulphuric acid dehydrating medium.

4. A process for stabilizing against hydration pigment-useful, insoluble anhydrite, at least 75% of the particles of which have an average particle size ranging from substantially .5-2 microns, which comprises contacting said anhydrite after its formation in the presence of sulphuric acid media and prior to complete removal of said media from the anhydrite, with from about .01-1% of a water-soluble protein, and recovering the resulting stabilized product.

5. A process for stabilizing against hydration pigment-useful, insoluble anhydrite, at least 75% of the particles of which have an average particle size ranging from substantially .5-2 microns, which comprises during conversion by dehydration of a hydrated form of calcium sulphate through sulphuric acid treatment, contacting said anhydrite while in the presence of said sulfuric acid and prior to complete removal of said acid from said anhydrite, with from about .01-1% of glue, and recovering the resulting stabilized glue-treated anhydrite.

6. A process for stabilizing pigment-useful, insoluble anhydrite against hydration, at least 75% of the particles of said anhydrite having an average size ranging from substantially .5-2 microns, which comprises precipitating insoluble anhydrite by reacting lime with sulphuric acid media, contacting said precipitated anhydrite, while in the presence of said sulphuric acid media and prior to complete removal of said acid from said precipitated anhydrite, with from about .01-1% of glue, and recovering the resulting stabilized glue-treated anhydrite.

7. A process for stabilizing pigment-useful, insoluble anhydrite against hydration, at least 75% of the particles of said anhydrite having an average size ranging from substantially .5-2 microns and none exceeding about 5 microns, which comprises during conversion by dehydration of a hydrated form of calcium sulphate through sulphuric acid treatment, contacting said anhydrite, while in the presence of said sulphuric acid and prior to complete removal of said acid from said anhydrite, with an aqueous solution containing glue in an amount ranging from about .01-1%, based on the anhydrite, and then recovering the resulting stabilized, glue-treated anhydrite.

8. A process for stabilizing pigment-useful, insoluble anhydrite against hydration, at least 75% of the particles of said anhydrite having an average size ranging from substantially .5-2 microns and none exceeding about 5 microns, which comprises precipitating insoluble anhydrite by reacting lime with sulphuric acid media, contacting said precipitated anhydrite, while in the presence of said sulphuric acid media and prior to complete removal of said acid media from said anhydrite, with an aqueous solution containing glue in an amount ranging from about .01-1%, based on the anhydrite, and then recovering the resulting stabilized glue-treated anhydrite.

9. A process for stabilizing pigment-useful, insoluble anhydrite against hydration, at least 75% of the particles of said anhydrite having an average size ranging from substantially .5-2 microns and none exceeding about 5 microns, which comprises precipitating insoluble anhydrite by gradually adding slaked lime to about 60° Bé. sulphuric acid, continuing the reaction until approximately 85% of the acid becomes neutralized, contacting said precipitate, while in the presence of said acidic and in a washing medium, with an aqueous solution containing glue in an amount ranging from .01-1%, based on the anhydrite, and then recovering the resulting stabilized, glue-treated anhydrite.

WINFIELD WALTER HECKERT.